(12) United States Patent
Jeffries et al.

(10) Patent No.: US 6,359,862 B1
(45) Date of Patent: *Mar. 19, 2002

(54) ATM NETWORK AVAILABLE BIT RATE (ABR) EXPLICIT RATE FLOW CONTROL SYSTEM

(75) Inventors: Clark Debs Jeffries, Clemson, SC (US); Ken Van Vu, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 08/978,178

(22) Filed: Nov. 25, 1997

(51) Int. Cl.[7] .................................................. H04J 3/24
(52) U.S. Cl. ........................ 370/232; 370/235; 370/395; 370/412; 370/468
(58) Field of Search ................................ 370/229, 230, 370/231, 232, 235, 236, 395, 412, 413, 414, 416, 419, 401, 402, 434, 253, 468, 249, 252, 233, 234, 465

(56) References Cited

U.S. PATENT DOCUMENTS

| | | | | |
|---|---|---|---|---|
| 5,313,454 A | * | 5/1994 | Bustini et al. | 370/231 |
| 5,469,545 A | * | 11/1995 | Vanbuskirk et al. | 370/434 |
| 5,790,770 A | * | 8/1998 | McClure et al. | 370/401 |
| 5,844,891 A | * | 12/1998 | Cox | 370/395 |
| 5,898,669 A | * | 4/1999 | Shimony et al. | 370/419 |
| 5,909,443 A | * | 6/1999 | Fichou et al. | 370/414 |
| 5,966,381 A | * | 10/1999 | Buckley et al. | 370/395 |
| 5,991,266 A | * | 11/1999 | Zheng | 370/229 |
| 5,991,268 A | * | 11/1999 | Awdeh et al. | 370/232 |
| 5,995,486 A | * | 11/1999 | Iliadis | 370/229 |
| 6,052,361 A | * | 4/2000 | Ansari et al. | 370/232 |
| 6,069,872 A | * | 5/2000 | Bonomi et al. | 370/236 |
| 6,094,418 A | * | 7/2000 | Soumiya et al. | 370/252 |

* cited by examiner

Primary Examiner—Douglas Olms
Assistant Examiner—Shick Hom
(74) Attorney, Agent, or Firm—Winstead, Sechrest & Minick, PC (57) ABSTRACT

A method of flow control for Available Bit Rate (ABR) sources in an Asynchronous Transfer Mode (ATM) network is implemented. An effective rate for the source is determined by an ATM switch based on a critically damped second order system. The effective rate is damped toward a share value that is based on the source queue length, a target queue length, and the actual cell rates of the connected ABR sources sending traffic through the ATM switch. The resulting feedback loop ensures that the source queue length will not exceed the target queue length.

13 Claims, 5 Drawing Sheets

ATM NETWORK AVAILABLE BIT RATE (ABR) EXPLICIT RATE FLOW CONTROL SYSTEM

CROSS-REFERENCED APPLICATIONS

The present invention is related to U.S. patent application Ser. No. 08/977,475 now abandoned, which is hereby incorporated by reference herein.

TECHNICAL FIELD

The present invention relates in general to data processing networks, and in particular to Available Bit Rate (ABR) data flow control in Asynchronous Transfer Mode (ATM) networks.

BACKGROUND INFORMATION

In early data communication networks, data flow control and error detection/recovery were typically performed at each intermediate node or system on the path between the source and destination systems. Such hop-by-hop operations were thought to be necessary to deal with data lost or corrupted as a result of using the then available high error rate data transmission technology and media.

Data transmission technology and media have improved over time, allowing data communications networks to evolve into systems in which flow control and error detection/recovery can become primarily the responsibility of nodes at the end points of a network data path. Minimizing packet processing operations (and the time required to perform such operations) at intermediate nodes reduces the time required to move the data from source to destination, that is, increases system throughput.

Asynchronous Transfer Mode or ATM technology is an increasingly pervasive example of a technology in which flow control and error detection/recovery are typically performed primarily at end nodes on a data path. In ATM systems, all data is transported in relatively short fixed length cells. Standard ATM cells have a five byte header, which carries cell control and routing information, and a forty-eight byte payload, which normally carries actual user data. The advantage of using fixed length cells is that such cells can be switched at extremely high speeds by special purpose hardware switches within the ATM network.

While the ATM cell structure may be standard, the data transported in such cells may represent different types of information having different, sometimes inconsistent characteristics and transport requirements. Transported data may represent computer data or audio information or image information. Examples of audio information include human speech or music. Examples of image information include "live" video or photographs or graphic or medical images.

Where the data being transported represents audio or video information, a loss of a certain amount of the data during transmission generally can be tolerated before the quality of the reconstructed audio or video information is noticeably degraded. However, certain kinds of such data, such as live video signals or speech, cannot be excessively delayed or subject to cell-to-cell end-to-end variations in transit time (that is, be subject to jitter) without causing a significant loss of quality of the reconstructed audio or video information. In contrast, a certain level of transmission delay or jitter is tolerable for computer data while loss or corruption of such data is generally intolerable.

Data which must be delivered with low tolerances on delay or jitter is characterized as real-time (RT) data. Data which is delay-tolerant is characterized as non-real-time (NRT) data. In most cases, RT data is loss-tolerant while NRT data is loss-intolerant.

Any data communications network, including an ATM network, has a limited capacity (bandwidth) available for the transport of user data. The goal of a network designer or administrator is to consistently use as much of that bandwidth as possible while continuing to satisfy loss and/or delay requirements for the different kinds of data that are transported. Generically, loss and delay requirements are referred to as Quality of Service or QOS requirements.

In an ATM network, a connection is normally set up each time a source node wishes to send data to a destination node in the network. The connection setup includes the selection of a route or path through the network and the establishment of service parameters and QOS guarantees for the duration of the connection. Multiple connections between source-destination pairs can concurrently use the same physical links in the network. To accommodate the different service requirements of different kinds of traffic in an ATM network, different classes of ATM traffic have been defined. The defined classes of interest are CBR (Constant Bit Rate), VBR (Variable Bit Rate) and ABR (Available Bit Rate). A fourth defined class of ATM traffic, Unspecified Bit Rate or UBR, is of no interest. UBR traffic has the lowest priority of any ATM traffic and is allocated only whatever network bandwidth is left over after the requirements of higher priority (CBR, VBR and ABR) classes of ATM traffic are satisfied.

CBR traffic is traffic that needs to be transmitted at a specified, substantially constant bit rate. Examples of CBR traffic include real-time audio or video traffic or an ATM network connection emulating a standard T1 (1.544 Mbit/s) line. CBR traffic is delay and jitter intolerant. During set up of a CBR connection, a Peak Cell Rate (PCR) must be negotiated to define the maximum rate at which data can be transported without creating a significant risk of cell loss. Data is typically then transmitted at the negotiated PCR rate. If an attempt in made to transmit traffic at a rate exceeding the PCR, the excess traffic may be discarded by the network.

VBR traffic includes two subclasses of traffic—VBR real-time (VBR-RT) and VBR non-real-time (VBR-NRT. VBR-RT traffic is traffic which may be generated at varying rates (that is, be bursty) while still requiring tight limits on acceptable limits of cell jitter. Examples of VBR-RT traffic include video signals generated by a variable-rate codec or aggregated voice traffic with silence removal. VBR-NRT traffic is traffic which may be bursty but which is more delay tolerant than VBR-RT traffic. An example of VBR-NRT traffic includes traffic resulting from transaction processing, such as credit verification or other point-of-sale operations.

For each VBR connection to be set up, a Peak Cell Rate, a Sustained Cell Rate (SCR) and a jitter tolerance value must be negotiated. The negotiated SCR represents the average throughput to be permitted over the connection. While traffic may be accepted from a VBR source at rates exceeding the negotiated SCR for short periods of time (as long as the excess rates do not exceed the negotiated PCR), the rate at which traffic will subsequently be accepted from the same source must be reduced below the SCR sufficiently to maintain the negotiated SCR over a longer period of time. To assure that the SCR parameter can be observed over a relatively long period of time, still another parameter, a burst tolerance, must be established when the connection is being set up. Burst tolerance defines how long a VBR connection will be allowed to accept traffic at rates greater than SCR before the traffic rate is reduced below SCR to maintain an overall throughput not exceeding SCR During these periods of reduced traffic activity and perhaps at other times during network operation, a significant amount of network bandwidth may be unused or idle. The ABR traffic class has been defined in an effort to exploit the availability of idle network bandwidth. ABR traffic is intended to make optimum use of what might otherwise be unused network bandwidth while utilizing traffic management techniques to monitor actual or incipient network congestion which might, if not taken into account, lead to unacceptable cell loss during transmission attempts.

The setup of an ABR connection requires negotiation of the same kind of PCR parameter that exists for a VBR connection. The PCR parameter serves the same purpose for both kinds of connections; namely, to limit the maximum rate at which traffic will be accepted for transmission over the connection. No effort is made to negotiate jitter or burst tolerances for ABR traffic. Instead, the ABR source and the network negotiate a Minimum Cell Rate (MCR) parameter representing the minimum amount of connection bandwidth that will always be available to the ABR traffic source. Generally, the MCR parameter represents the minimum transmission rate which must be available if the ABR traffic source or application is to stay alive, i.e., continue to execute.

For CBR and VBR connections in an ATM network, no effort is made to dynamically control congestion (network traffic loads) from within the network. If, however, the goal is to achieve maximum utilization of what would otherwise be idle network bandwidth, it makes sense to attempt to dynamically control congestion through the use of closed-loop congestion management techniques. Such techniques monitor network traffic and provide feedback to a traffic source to permit that source to adjust the rate at which traffic is made available to the network. Knowing that source traffic rates can be adjusted, a more aggressive approach to allocating bandwidth to ABR traffic may be implemented.

A more sophisticated feedback mechanism, identified as Explicit Rate Marking (ERM), allows the intermediate switches to play a larger role in the control of network congestion. Generally speaking, an ERM switch monitors the state of the network at the switch by making specific measurements of network operating parameters. If the measurements indicate that additional bandwidth is available for a specific ABR connection, the switch calculates a new explicit rate (ER) for the ABR traffic that it can accept from the source. The calculated, new explicit rate is written into RM cells received from the associated source for eventual delivery to the source. The source station responds by increasing the source transmission rate to make better use of the idle bandwidth.

Different algorithms are used in the prior art to generate ER values. However, these do not offer delay guarantees. That is, the present art does not bound queuing delays. Thus, there is a need in the art for an improved ER mechanism and apparatus that ensures that queuing delays are smaller than a predetermined maximum value.

SUMMARY OF THE INVENTION

The present invention addresses the previously mentioned needs by providing a method and apparatus for generating ER values that ensure that a predetermined maximum queue length is not exceeded. A closed-loop feedback system is implemented based on ERM in which ER values are generated based on the concept of a critically damped system. A next explicit rate to be transmitted to an ATM ABR source in order to instruct the source how to adjust its traffic rate is generated using an algorithm that seeks to damp the ER towards a time-dependent share value.

The ATM device seeking to control the source traffic rate first determines the actual cell rate for each active ABR connection. It does so by monitoring the cell traffic from the source during a preselected interval of time. The actual cell rate is simply computed as the number of cells from the source passing through the device per unit time. However, the actual cell rate so obtained is the actual cell rate of the source at time that is earlier than the time at which the cells are counted by an amount equal to the travel time between the source and the controlling ATM device. The controlling ATM device then determines a share value according to an algorithm using the aggregate of the actual cell rates determined for each connected ABR source.

The controlling ATM device then determines a present ER value using this share value and the two previous ER values it sent to the source. The present ER value is determined by a rule such that the sequence of ER values issued in succeeding RM cells is damped toward the share value.

After the present ER value is determined, the controlling ATM device transmits it to the source. The present ER value is incorporated into the ER field of a Backward Resource Management (BRM) cell. The source receiving the BRM adjusts its actual cell rate to be equal to, or smaller than, the ER encapsulated in the BRM. Note, however, that the new actual cell rate so determined corresponds to an ER value that was transmitted to the source one transit time earlier. That is, the "present" time at the source is advanced by a transit period from the time corresponding to the ER value received by the source.

BRIEF DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
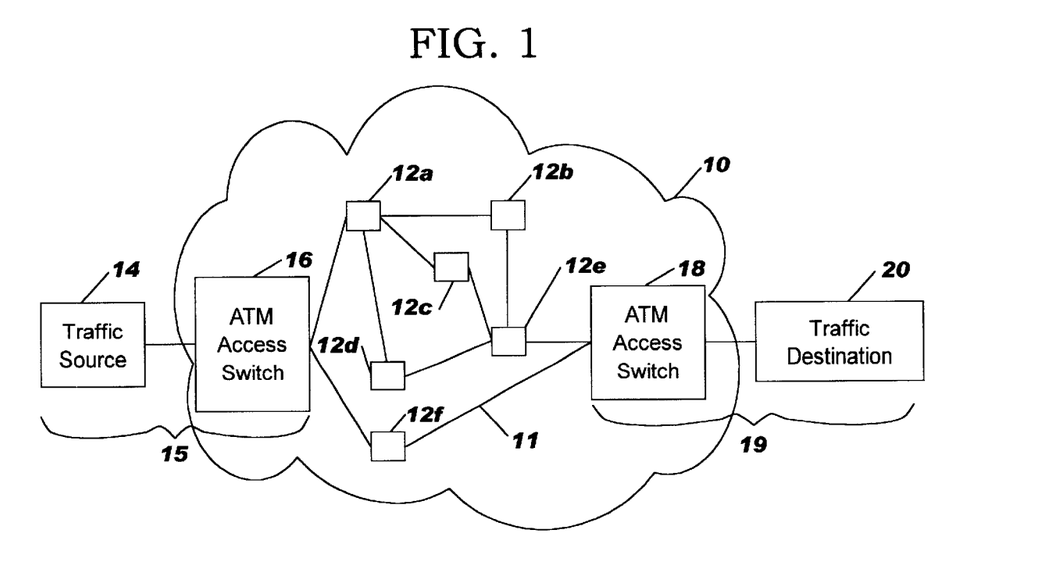
FIG. 1 is a schematic representation of an Asynchronous Transfer Mode (ATM) network within which the present invention may be used.

As shown in FIG. 1, an ATM system is commonly referred to as including a cloud 10, cloud being a term of art that collectively represents the various nodes (communication systems) and links (transmission media) that are within the system. For a particular data path set up between a traffic source 14 and a traffic destination 20, the nodes can be characterized as intermediate nodes, such as nodes 12a through 12f, or endpoint nodes. An endpoint node is either a source or destination system in combination with the hardware and software needed to access the remainder of the ATM network. The combination of traffic source 14 and an ATM access switch 16 is an example of a source endpoint 15 while the combination of traffic destination 20 and an ATM access switch 18 is an example of a destination endpoint 19.

It needs to be understood that the role (and characterization) of any particular node may change for different network connections. For example, for a different connection, endpoint 19 might either serve as a traffic source or as an intermediate node on a path between two other nodes.

The various nodes are shown as being interconnected by links, such as link 11. The representation of the links is not intended to imply that all of the links are the same. Each link may be any of several known types of media capable of supporting high speed digital traffic, including copper wire, optical fiber or even microwave or satellite wireless links.

Figure 2:
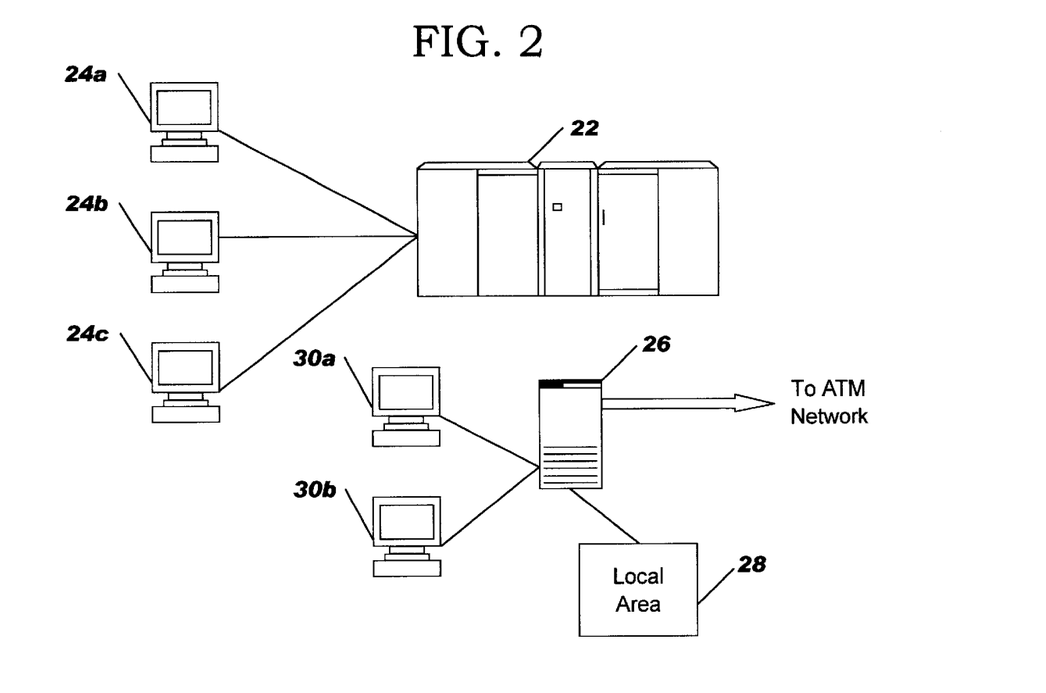
FIG. 2 is illustrative of the kinds of data processing and/or communication equipment which can exist at a node in an ATM network.

FIG. 2 is a more detailed representation of the kind of data processing equipment that might be found at a typical node in an ATM system. The node could include a mainframe 22 with a number of directly connected terminals, such as terminals 24a, 24b and 24c used to support input/output operations for a transaction processing application, such as credit verification. The node would also include an ATM access switch 26 connected both to the remainder of the ATM network (not shown) and to the mainframe and possibly to a local area network 28 and one or more terminals, such as terminals 30a and 30b, used in a high bandwidth application, such as a videoconferencing application. In a given installation, additional controllers or network elements, such as a communication controller or a router, might be part of the system. For example, a router or a communication controller (neither of which is shown) might be interposed between the mainframe 22 and the ATM access switch 26. Similarly, the terminals 24 might be connected indirectly to mainframe 22 through a display controller (not shown).

An ATM access switch can perform a number of functions in a typical system. The access switch may serve to aggregate or concentrate data provided by the various connected components. Also, where the connected components generate data in something other than native ATM cell format, the access switch 26 may perform necessary segmentation/operation/sequencing operations to convert the data from its original format to the standard ATM cell format.

Figure 3:
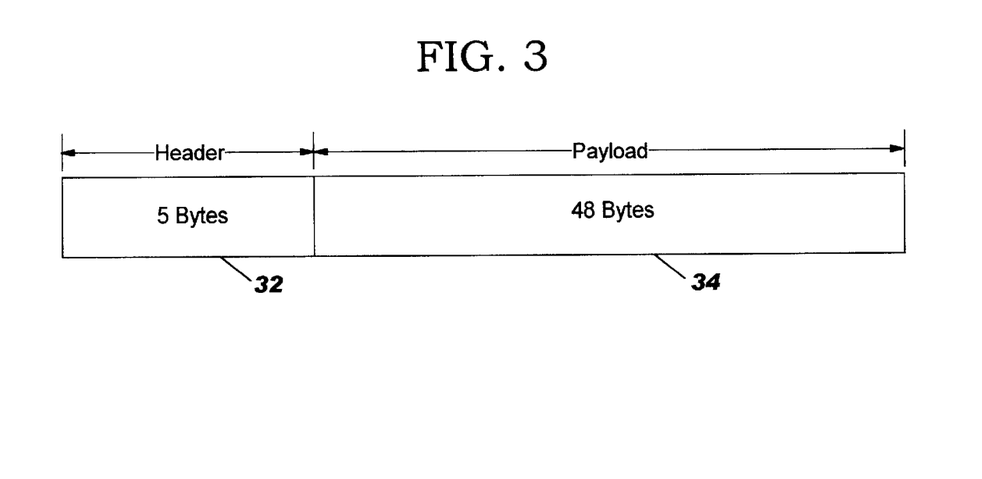
FIG. 3 depicts the overall structure of a standard ATM data cell.

FIG. 3 shows the major elements of a standard ATM cell; namely, a five byte header 32 and a forty-eight byte payload 34. The header 32 contains routing and cell control information. When a connection is set up between two endpoints, the path through the network is defined and is identified by the contents of VPI (Virtual Path Identifier) and VCI (Virtual Channel Identifier) fields in the header. The header further includes a three bit Payload Type Indicator (PTI) field which identifies the cell as a specific type of user data cell or a control cell, such as a Resource Management cell. A single bit Cell Loss Priority (CLP) field determines whether the cell should be discarded if network congestion is detected. Finally, the header includes a Header Error Correction (HEC) field which can be used to identify a cell having a corrupted header and for cell delineation purposes.

Figure 4:
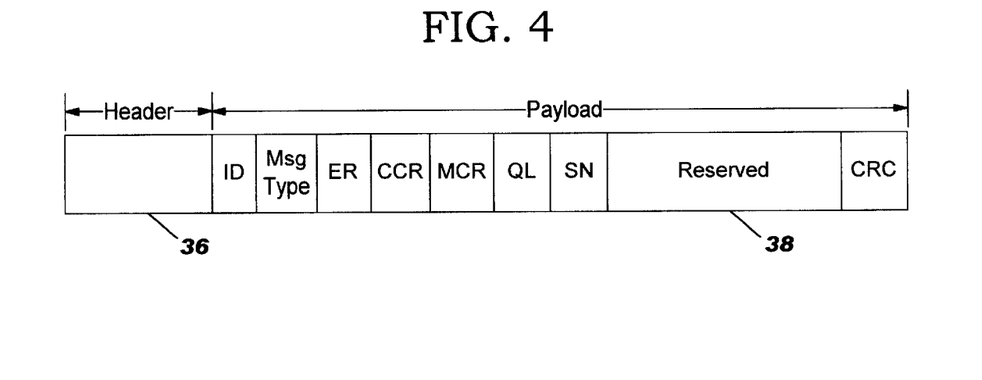
FIG. 4 depicts the fields of a Resource Management (RM) cell, a special kind of ATM cell.
Figure 5:
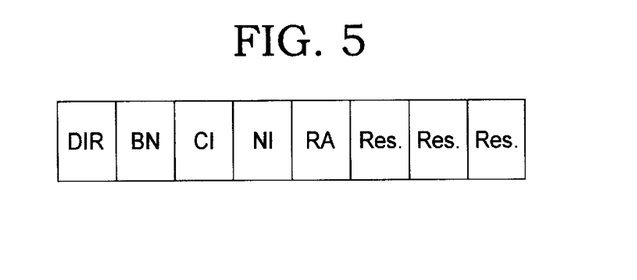
FIG. 5 is an expanded view of the bits in a Message Type field in an RM cell.

A Resource Management (RM) cell is a special ATM cell conforming to the cell structure shown in FIG. 4 and generated by the source every Nrm-1 data cells where Nrm is a constant independent of source transmission rate. Like all other ATM cells, an RM cell has a five byte header 36 and a forty-eight byte payload 38. The RM payload, however, is divided into a number of fields, each of which serves a specific function in managing network operation. Table 1 below provides a brief description of the fields included in the forty-eight byte payload of an RM cell.

TABLE 1

| NAME | LENGTH | DESCRIPTION |
|---|---|---|
| ID | 1 byte | Identifies the service using the RM cell. |
| Msg Type | 1 byte | Flow control functions. See FIG. 5. |
| ER | 2 bytes | Explicit Rate - used in control of source transmission rate |
| CCR | 2 bytes | Current Cell Rate - current actual transmission rate |
| MCR | 2 bytes | Minimum Cell Rate - minimum available for ABR connection |
| QL | 4 bytes | Queue Length - not used for ABR service |
| SN | 4 bytes | Sequence Number - not used for ABR service |
| Res. | 30+ bytes | Reserved. Not currently used. |
| CRC | 1+ bytes | Cyclical Redundancy Check - error correction character |

The Reserved and CRC fields are described as 30+ and 1+ bytes, respectively, since one byte in the payload is allocated between six reserved bytes and two bytes which are used in defining a ten-bit CRC character.

FIG. 5 is an expanded view of the subfields of the Msg Type field in the RM cell with each subfield being one bit in length. The content of the DIR subfield indicates the direction of data flow associated with the RM cell. The content of the BN field indicates whether the RM cell is a Backward Explicit Notification Cell (BECN) generated by a destination or intermediate switch. The CI (Congestion Indicator) bit can be set to indicate congestion in the network while the NI (No_increase Indicator) bit can be used to prevent a source from increasing actual transmission rate. The RA bit is not used for ABR service and the Res. bits are reserved for future implementation of yet undefined functions.

Figure 6:
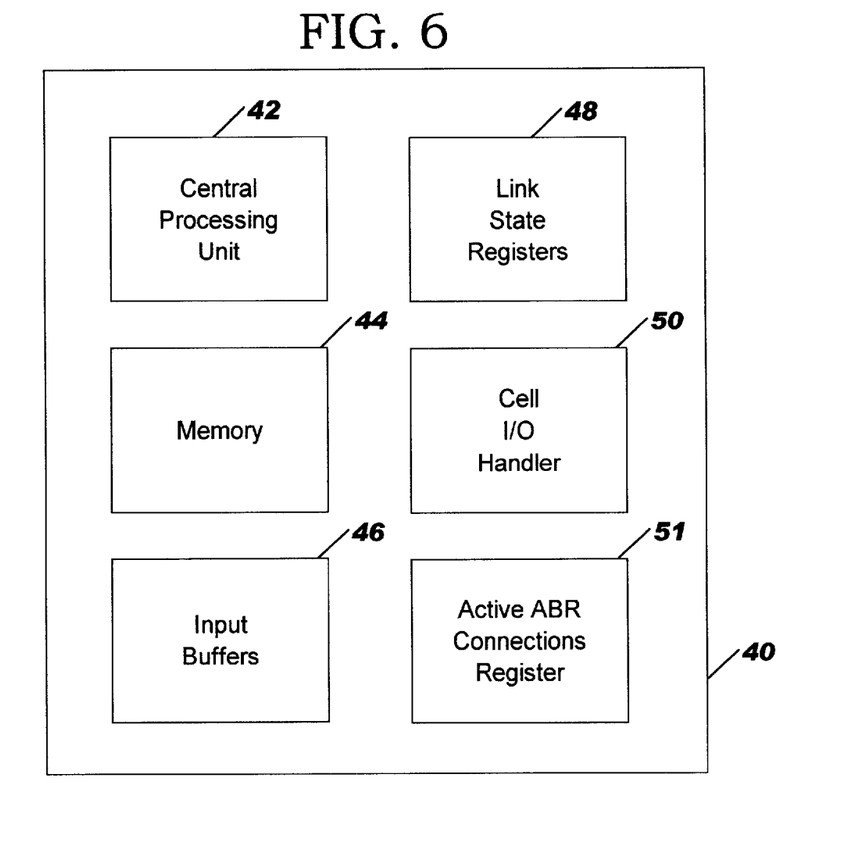
FIG. 6 is a high level view of components of a data processing/handling system which can be used to implement the present invention.

The present invention provides a technique for increasing ABR source transmission rates using ER cell marking. While the technique might be implemented in special purpose hardware components, it may be implemented in a switch control system using general purpose data processing components such as those shown in FIG. 6. A typical system 40 would include a central processing unit 42, control and data memory 44, input buffers 46 for temporarily storing cells received from other nodes in the network, link state registers 48 for storing information about the state of various links connected to the system and a cell I/O handler 50 for performing necessary input/out and switching functions. The system would also include a register or set of registers 51 for identifying currently active ABR connections. For purposes of the present invention, an active ABR connection is a connection over which at least one RM cell has been received during a current control period. The specific types of functions which would be implemented in each of the components will be described below with reference to other figures.

Figure 7:
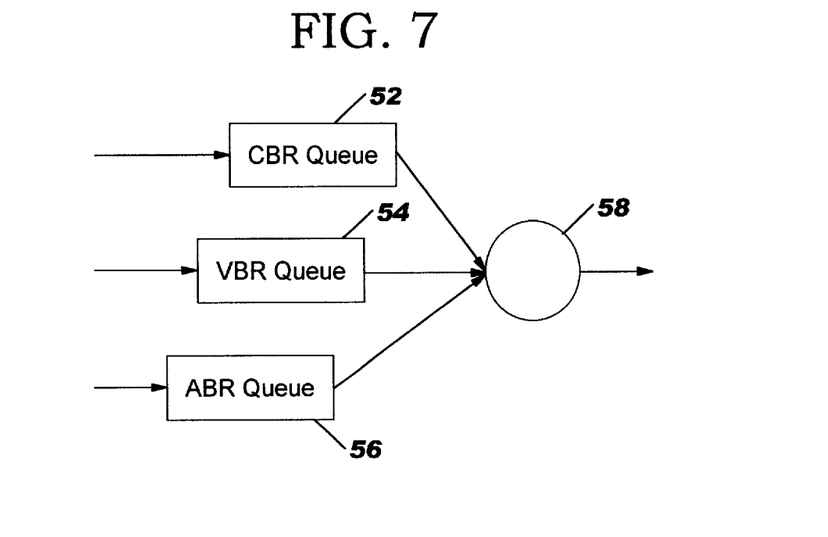
FIG. 7 shows the input queue or buffer structure for a typical ATM switch.

The input buffers serve as cell transfer queues for providing temporary cell storage at the input to the ATM switch. Different queues are used for different classes of ATM traffic although each queue operates on a First-in First-Out basis. Referring to FIG. 7, three separate queues 52, 54, and 56 are shown for CBR, VBR and ABR traffic respectively with the output of the queues providing a single input stream for an ATM switch 58 at the node. The queues are processed in the following order: CBR, VBR, ABR. As would be expected from the earlier definition of CBR service, cells in the CBR queue are given the highest priority since any cell in the CBR queue may need to processed to maintain the constant bit rate negotiated for a CBR connection. ABR cells are transmitted only if there is no cell waiting in either of the CBR or VBR queues.

As noted previously, an ABR traffic class was defined in order to permit utilization of network bandwidth when that bandwidth is not being used for CBR or VBR traffic. VBR commitments make the net available capacity of a switch unknowable, yet we wish to allocate bandwidth to ABR sources as efficiently as possible. A switch observes traffic and sends flow control levels, namely, the ER, to sources. The effect of such control decisions is not noticed at the switch until a period of time has elapsed corresponding to the round-trip time to a source and back to the switch. Furthermore, different sources at different distances have different time delays. The switch knows present and past explicit rates and knows its own present capacity which might be affected by outside factors. The switch needs a rule to compute next explicit rates from its own present and previous explicit rate, service rate, and actual rate information. A rule for determining ERs based on the notion of a critically damp second order system will now be described.

Figure 8:
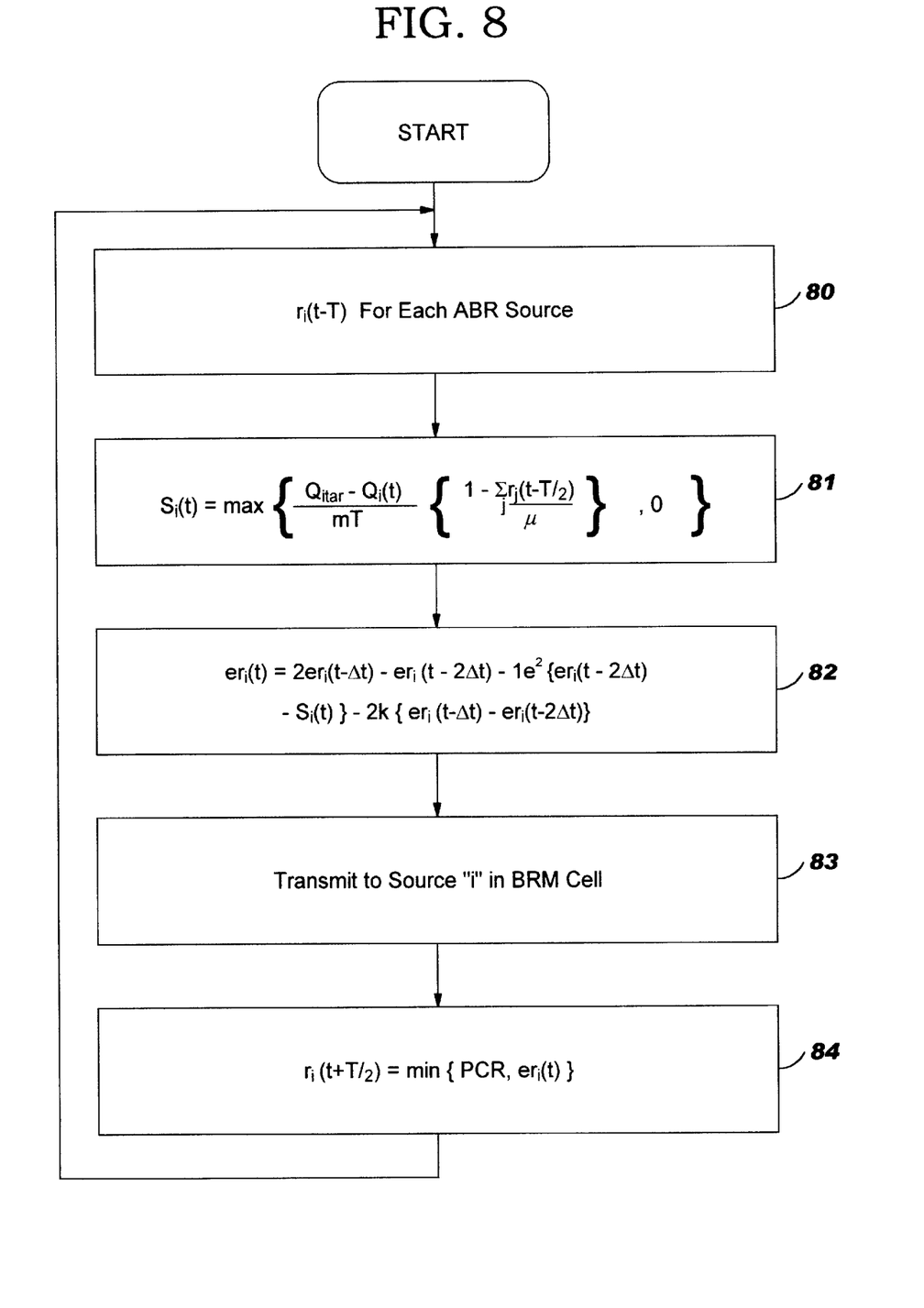
FIG. 8 depicts a flow diagram in accordance with an embodiment of a method of the present invention.

FIG. 8 illustrates a process for generating new Explicit Rate values for every active ABR connection to a node at which the process is implemented. A share of network capacity is defined, and critical damping is used to drive data flow rates toward a share. The share is determined from basic system parameters and the current data throughput in a manner to be subsequently described. RM cells arrive at an ATM switch every $\Delta t$ units of time. This system parameter determines the rate at which flow control decisions are made. The process of the present invention starts just prior to the time a flow control decision is to be made. At that instant, t, the ATM device making the flow control decision determines the actual cell rate for each of the connected ABR sources. For convenience of notation, the actual cell rate will be denoted $r_i$. The index "i" denotes that there is an actual rate associated with each connected ABR source. Because of the finite transit time of cells through the network, at the instant of time, t, the actual rate determined by the ATM device is accurate but delayed. That is, it is the actual cell rate of a source but it is a cell rate established by a flow control decision made by the ATM device a period of time, T, earlier, and sent a time T/2 earlier. The value of time, T, corresponds to the round-trip transit time for a cell between the controlling ATM device and the source.

Therefore, in step 80, the time-dependent actual cell rate for a source is denoted $r_i$ (t–T/2). In step 81, the ATM device determines a share value.

Important in the specification of the share value is the target maximum value for each source queue, denoted $Q_{itar}$. In this way, the explicit rate flow control system of the present invention ensures that queue delays are bounded. The share value is determined by the ATM device, in step 81, according to the rule:

$$S_i(t)=\max\{0,[Q_{itar}-Q_i(t)][1-\Sigma r_j(t-T/2)/\mu(t)]/[m(t)T]\} \qquad (1)$$

The share, $S_i$, defined by the rule in Equation (1), depends on the totality of actual cell rates, denoted by the summation over the actual cell rates of all of the connected ABR sources. Because these actual rates are delayed rates as previously discussed, share, S, is also denoted as a delayed share. In Equation (1), $Q_i$ denotes the time-dependent queue associated with ABR source number "i". The number of connected ABR sources is denoted by "m", and is a time-dependent quantity. The quantity m(t) represents the time-dependent link capacity. The delayed share, $S_i$ (t) is used by the ATM device to generate an ER flow control. The ATM device determines its next ER flow control using the delayed share $S_i$ (t) based on a critical damping rule. In addition to the delayed share, the rule relies on the two previous ER values sent to source number "i". The ATM device determines the next ER to be sent to source i according to the rule:

$$er_i(t)=2er_i(t-\Delta t)-er_i(t-2\Delta t)-k^2[er_i(t-2\Delta t)-S_i(t)]-2k[er_i(t-\Delta t)-er_i(t-2\Delta t)] \qquad (2)$$

In Equation (2), $er_i(t-\Delta t)$ is the ER flow control transmitted to source i in the immediately preceding BRM dispatched to source i. Similarly, the quantity $er_i(t-2\Delta t)$ is the ER flow control transmitted to source i in the BRM preceding the last BRM transmitted. That is, the next ER flow control that the ATM device will send depends on the two ERs immediately preceding. In Equation (2), the quantity k is a damping constant. Its value determines the speed at which the ER flow control signal is driven toward the delayed share value. After determining the ER flow control signal according to the rule in Equation (2), the ATM device sends it to source i.

In step 83, the ER flow control signal at instant t is encapsulated in a BRM cell and transmitted to source i. This BRM cell is received at source i after the transit time, T/2, has elapsed. Source i then adjusts its actual rate $r_i$ to be less the minimum of the ER flow control in the BRM cell transmitted to it by the controlling ATM device at the instant of time t and a negotiated Peak Cell Rate (PCR) (step 84). The loop is closed when the cells sent by the source at the new rate are received at the ATM device, and the cell traffic is monitored during a preselected time interval to determine the cell flow rate.

The value of the damping constant affects the stability of the system.

In an embodiment of the present invention in which the round-trip transit time, T, is about ten times the time interval between RM cells, the damping constant, k, should be in the range from about 0.01 to 0.1. The value of k is preselected. In yet another embodiment of the present invention, stability may be enhanced by determining shares using the rule $$S_i(t)=\max\{0,f[Q_{itar}-Q_i(t)][1-\Sigma r_j(t-T/2)/\mu(t)]/[m(t)T]\} \qquad (3)$$

in step 81 of FIG. 8. In Equation (3), the factor, f, lies in the range between 0 and 1. As f approaches 0, queue length for a given traffic pattern ultimately becomes 0, but throughput also declines. As the value of f approaches 1, the flow control system of the embodiment of the present invention according to Equation (3) approaches the embodiment wherein the share is determined according to Equation (1).

Figure 9:
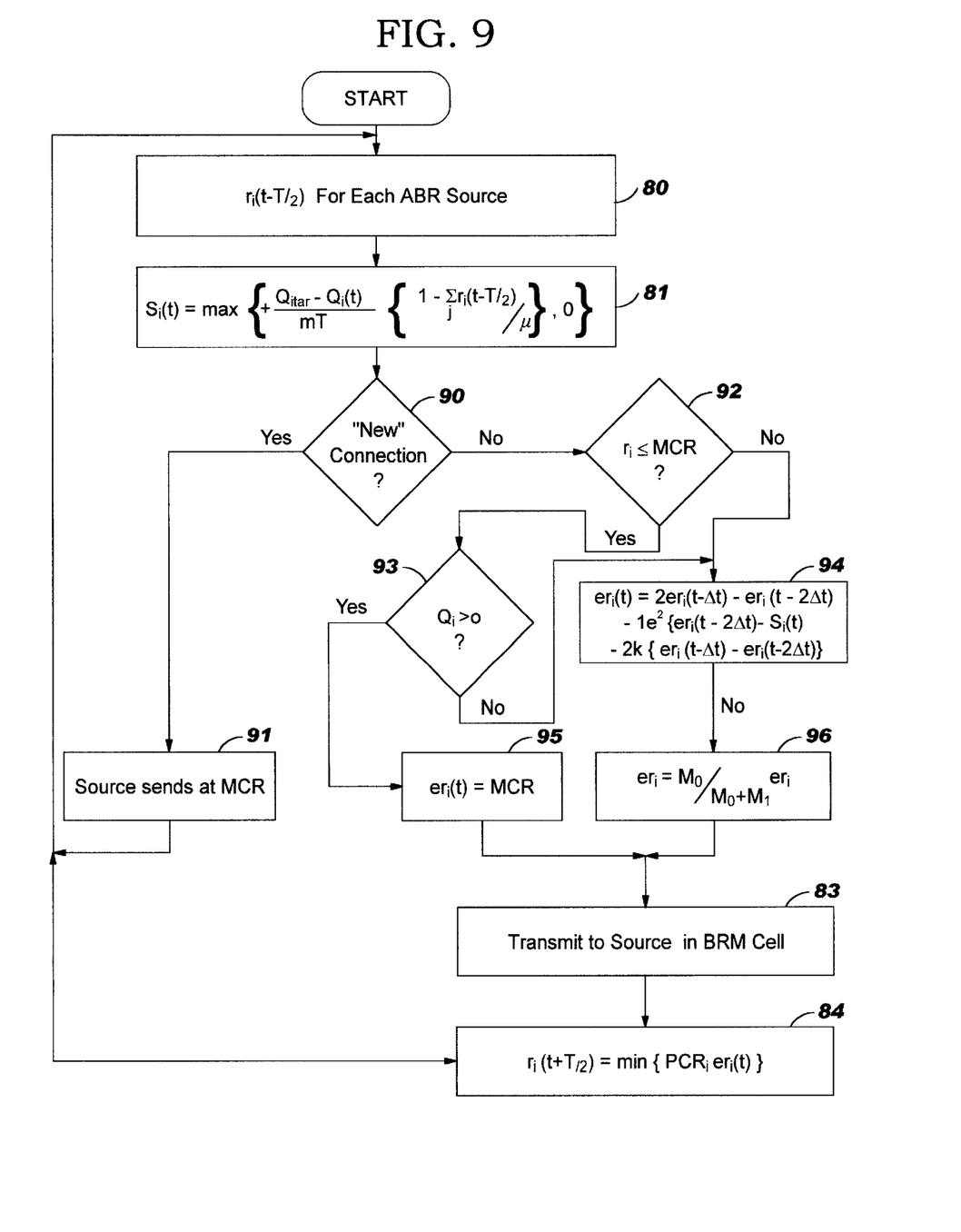
FIG. 9 illustrates a flow diagram in accordance with an alternative embodiment of a method of the present invention.

An embodiment of a flow control system according to the present invention having new connections added to a set of existing connections will now be described. Refer now to FIG. 9 in which a flow diagram representing such an embodiment of the present invention is illustrated. A controlling ATM device having ER flow control according to the method of the present invention, determines the actual cell rate and the delayed share, steps 80 and 81, as in the embodiments heretofore discussed. If a connection is a "new" connection, step 90, then the ATM switch has no prior explicit rates for that source on which to base a current ER. The controlling ATM device does not feed back an ER control signal to establish the cell rate or the source; instead, the source then runs at a negotiated minimum cell rate (MCR), step 91. A connection is a new connection until a time interval equal to the closed-loop transit time, T, elapses.

If the source connection is not a new connection, the current rate, $r_i$, is compared to the MCR in step 92. If this $r_i$ value is equal to the MCR, then the queue length for the source is tested in step 93. If the queue length is not equal to zero, the ER is set equal to MCR in step 95. Otherwise, a new ER value is determined in step 94 based on a second order critically damped system as in the embodiments previously described and then is reduced in inverse proportion to the number of old connections, $m_0$, plus the number of new connections, $m_1$, in step 96. Then the ER is encapsulated in a BRM cell and the source adjusts its actual rate to be less than or equal to the ER value one transit time later, steps 83 and 84, respectively, just as in the embodiments discussed hereinabove.

What is claimed is:

1. A method of data flow control comprising the steps of:
   determining an actual data cell rate for each connected source;
   determining a share using said actual data cell rate for each connected source; and
   determining an explicit rate (ER) flow control signal using said share, wherein said step of determining an ER flow control signal comprises determining an ER flow control signal according to a second order critically damped system.

2. The method of claim 1 wherein said ER flow control signal is calculated from:

$$er_i(t)=2er_i(t-\Delta t)-er_i(t-2\Delta t)-k^2[er_i(t-2\Delta t)-S_i(t)]-2k[er_i(t-\Delta t)-er_i(t-2\Delta t)].$$

3. The method of claim 2 wherein, said share is calculated from:

$$S_i(t)=\max\{0,f[Q_{tar}-Q_i(t)][1-\Sigma r_j(t-T/2)/\mu(t)]/[m(t)T]\}.$$

4. The method of claim 3 wherein a damping rate, k, is in a range from 0 to 1.

5. The method of claim 3 wherein a damping rate, k, is in the range from 0.01 to 0.1.

6. The method of claim 4 wherein a constant factor, f, is in a range from 0 to 1.

7. The method of claim 1 further comprising:
   a step of sending ER to said source.

8. The method of claim 7 wherein said step of sending ER flow control signal to said source comprises:
   encapsulating said ER flow control signal in a Backwards Resource Management.

9. The method of claim 7 further comprising the steps of:
   determining if a source connection is a new connection; and
   bypassing said step of sending said ER flow control signal if said source connection is said new connection.

10. The method of claim 9 further comprising the steps of:
    comparing said actual cell rate of said source with a Minimum Cell Rate if said source connection is not a new connection;
    determining if a source queue is empty if said actual cell rate is equal to said Minimum Cell Rate;
    reducing said ER flow control signal by a numerical factor if said source queue is empty; and
    setting said ER flow control signal to be equal to said Minimum Cell Rate if said source queue is empty.

11. The method of claim 10 wherein said numerical factor is equal to a ratio of a number of old connections to a sum of said number of old connections plus a number of new connections.

12. The method of claim 11 further comprising the step of sending said ER flow control signal to said source.

13. The method of claim 12 wherein said step of sending said ER flow control signal comprises and capsulating said ER flow control signal in a Backward Resource Management cell, and sending said Backward Resource Management cell to said source.

* * * * *